United States Patent

Bühler

[11] Patent Number: 5,760,197
[45] Date of Patent: Jun. 2, 1998

[54] HYDROXYQUINOLONE MONOAZO DYESTUFFS, THEIR PREPARATION AND USE

[75] Inventor: Ulrich Bühler, Alzenau, Germany

[73] Assignee: Dystar Japan Ltd., Osaka, Japan

[21] Appl. No.: 675,451

[22] Filed: Jul. 3, 1996

[30] Foreign Application Priority Data

Jul. 4, 1995 [DE] Germany ............ 195 24 274.2

[51] Int. Cl.⁶ ............ C07D 215/233; C07D 215/227; C07D 215/38
[52] U.S. Cl. ............ 534/768; 534/771; 546/155
[58] Field of Search ............ 546/155; 534/768, 534/771

[56] References Cited

U.S. PATENT DOCUMENTS

| | | | |
|---|---|---|---|
| 1,969,463 | 8/1934 | Holzach et al. | 534/771 |
| 1,969,464 | 8/1934 | Holzach et al. | 8/696 |
| 2,529,924 | 11/1950 | Dickey | 534/771 |
| 3,483,179 | 12/1969 | Braun | 546/155 |

FOREIGN PATENT DOCUMENTS

| | | |
|---|---|---|
| 0 033 527 | 8/1981 | European Pat. Off. . |
| 43-15660 | 7/1968 | Japan . |
| 45-40190 | 12/1970 | Japan . |
| 46-14832 | 4/1971 | Japan . |
| 49-80137 | 8/1974 | Japan . |

Primary Examiner—C. Warren Ivy
Assistant Examiner—D. Margaret M. Mach
Attorney, Agent, or Firm—Connolly & Hutz

[57] ABSTRACT

Hydroxyquinolone monoazo dyestuffs of the formula I

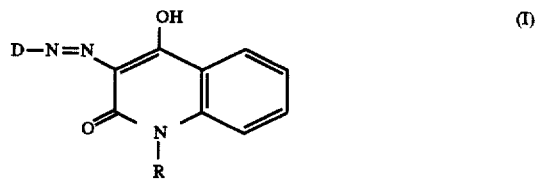

(I)

in which D is an organic radical such as one of the disclosed aromatic radicals, and R is substituted or unsubstituted alkyl, benzyl, phenyl, phenoxy, or alkoxy (most preferably $C_1$–$C_6$-alkyl) are especially well suited to dyeing and printing of hydrophobic materials and other dyeing or printing applications. The dyestuffs are prepared by diazotizing an amine (D—$NH_2$) and coupling the diazotization product to a hydroxyquinolone compound.

12 Claims, No Drawings

HYDROXYQUINOLONE MONOAZO DYESTUFFS, THEIR PREPARATION AND USE

FIELD OF THE INVENTION

The present invention relates to dyestuffs which include the following hydroxyquinolone monoazo radical:

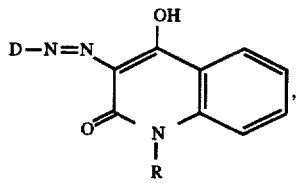

(I)

Other aspects of this invention include processes for the preparation of hydroxyquinolone monoazo dyestuffs and uses of the resulting dyestuffs.

DESCRIPTION OF THE PRIOR ART

Hydroxyquinolone azo dyestuffs including, in particular, those in which R in the radical set forth above is hydrogen are already known in principle and are described, for example, in U.S. Pat. No. 1,969,463; U.S. Pat. No. 2,529,924; DE-C-1 244 314; DE-C-541 072; H. Waldmann, J. Prakt. Chem. 147 (1937), 321; A. Meyer and R. Vittenet, Ann. Chim. <10> 17 (1932), 271; L. Pentimalli, Chim. Ind. (Milan) 39 (1957), 11. DE-A-3 246 788 describes the use of the bisazo dyestuff which is already known from DE-C-1 244 314 and is obtained from 1-methyl-4-hydroxy-2-quinolone as the coupling component and 4-aminoazobenzene as the diazo component in alkaline discharge or discharge reserve printing.

However, the known hydroxyquinolone azo dyestuffs have significant deficiencies in various fastness properties during use, such as fastness to thermofixing, fastness to light, fastness to water and fastness to solvents, and in their dyeing properties on various substrates and under various dyeing conditions, in particular during dyeing in an alkaline medium, and do not meet the requirements currently imposed by important industrial uses. Surprisingly, it has now been found that the hydroxyquinolone azo dyestuffs according to the invention have considerable advantages over the known dyestuffs in their fastness properties during use and in their dyeing properties. Compared with the bisazo dyestuffs of DE-C-1 244 314, for example, they are not phototropic and, with their neutral yellow to greenish-tinged yellow shade, can be employed not only as a shading component for opaque shades but also, for example, as a mixing component for clear green shades.

SUMMARY OF THE INVENTION

The present invention relates to hydroxyquinolone monoazo dyestuffs of the formula I

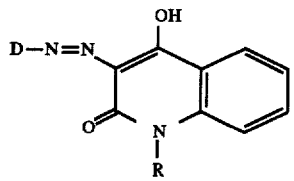

(I)

in which

R is $(C_1-C_6)$-alkyl, benzyl or phenyl, or is $(C_2-C_4)$-alkyl, which is mono- or disubstituted by chlorine, bromine, $(C_1-C_4)$-alkoxy, phenyl, phenoxy, phenyl which is mono- or disubstituted by methyl, chlorine or methoxy or phenoxy which is mono- or disubstituted by methyl, chlorine or methoxy; and D is an organic radical, preferably one of the aromatic radicals described below.

Organic radicals suitable for substituent D are benzothiazol-2-yl or benzothiazol-2-yl which is monosubstituted by chlorine, bromine, nitro, methoxy, ethoxy, methyl or methylsulfonyl or disubstituted by chlorine, or a phenyl radical of the formula II

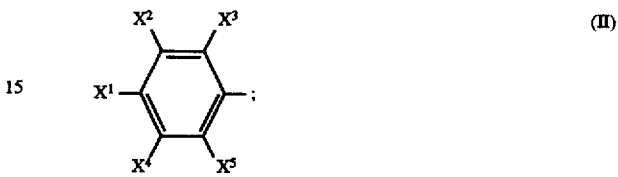

(II)

wherein one of the two radicals $X^1$ and $X^2$ is hydrogen, chlorine, bromine or methyl; $((C_1-C_6)$-alkyl)carbonyl, substituted $((C_1-C_6)$-alkyl)-carbonyl, cyclohexylcarbonyl, phenylcarbonyl or substituted phenylcarbonyl; $((C_1-C_6)$-alkylsulfonyl, substituted $(C_1-C_6)$-alkylsulfonyl, allylsulfonyl, cyclohexylsulfonyl, phenylsulfonyl or substituted phenylsulfonyl; N-$((C_1-C_6)$-alkyl)aminocarbonyl, N-($(C_1-C_6)$-alkyl)aminocarbonyl which is substituted in the alkyl radical, N-cyclohexylaminocarbonyl, N-allylaminocarbonyl, N-phenylaminocarbonyl or N-phenylaminocarbonyl which is substituted in the phenyl radical; N,N-di-$((C_1-C_6)$-alkyl)aminocarbonyl, N,N-di-($(C_1-C_6)$-alkyl)aminocarbonyl which is substituted in one of the two alkyl radicals, N,N-di-$((C_1-C_6)$-alkyl) aminocarbonyl which is substituted in both alkyl radicals, N-phenyl-N-$((C_1-C_6)$-alkyl)aminocarbonyl, N-phenyl-N-($(C_1-C_6)$-alkyl)-aminocarbonyl which is substituted in the alkyl radical, N-phenyl-N-$((C_1-C_6)$-alkyl)aminocarbonyl which is substituted in the phenyl radical, N-phenyl-N-($(C_1-C_6)$-alkyl)-amino-carbonyl which is substituted in the alkyl radical and in the phenyl radical, N,N-diallylaminocarbonyl, N-allyl-N-$((C_1-C_6)$-alkyl) aminocarbonyl, N-allyl-N-$((C_1-C_6)$-alkyl)-aminocarbonyl which is substituted in the alkyl radical, N-allyl-N-phenylaminocarbonyl, N-allyl-N-phenylaminocarbonyl which is substituted in the phenyl radical, N,N-dicyclohexylaminocarbonyl, N-cyclohexyl-N-$((C_1-C_6)$-alkyl)aminocarbonyl, N-cyclohexyl-N-$((C_1-C_6)$-alkyl)-aminocarbonyl which is substituted in the alkyl radical, N-cyclohexyl-N-phenylaminocarbonyl, N-cyclohexyl-N-phenyl-aminocarbonyl which is substituted in the phenyl radical or N-cyclohexyl-N-allylaminocarbonyl; N,N-di-($(C_1-C_6)$-alkyl)aminosulfonyl, N,N-di-$((C_1-C_6)$alkyl) aminosulfonyl which is substituted in one of the two alkyl radicals, N,N-di-$((C_1-C_6)$-alkyl)aminosulfonyl which is substituted in both alkyl radicals, N-phenyl-N-$((C_1-C_6)$-alkyl)aminosulfonyl, N-phenyl-N-($(C_1-C_6)$-alkyl)-aminosulfonyl which is substituted in the alkyl radical, N-phenyl-N-$((C_1-C_6)$-alkyl)aminocarbonyl which is substituted in the phenyl radical, N-phenyl-N-$((C_1-C_6)$-alkyl) aminosulfonyl which is substituted in the alkyl radical and in the phenyl radical, N,N-diallylaminosulfonyl, N-allyl-N-$((C_1-C_6)$-alkyl)aminosulfonyl, N-allyl-N-$((C_1-C_6)$-alkyl) aminosulfonyl which is substituted in the alkyl radical, N-allyl-N-phenylaminosulfonyl, N-allyl-N-phenylaminosulfonyl which is substituted in the phenyl radical, N,N-dicyclohexylaminosulfonyl, N-cyclohexyl-N-($(C_1-C_6)$-alkyl)aminosulfonyl, N-cyclohexyl-N-$((C_1-C_6)$-alkyl)aminosulfonyl which is substituted in the alkyl radical, N-cyclohexyl-N-phenylaminosulfonyl, N-cyclohexyl-N-phenylaminosulfonyl which is substituted in the phenyl radical or N-cyclohexyl-N-allylaminosulfonyl; and the other of the two radicals $X^1$ and $X^2$ is hydrogen, chlorine, bromine or methyl, and $X^1$ additionally is also ($C_2$–$C_4$)-alkyl, fluorine, phenyl, benzyl, cyclohexyl or ($C_2$–$C_4$)-alkoxy; $X^3$ is hydrogen, chlorine, bromine, nitro or methyl; $X^4$ and $X^5$ independently of one another are hydrogen, chlorine, bromine or methyl; and in which at least one of the radicals $X^1$, $X^2$, $X^3$, $X^4$ and $X^5$ has a meaning other than hydrogen, and in which, if $X^3$ is nitro and at the same time $X^2$, $X^4$ and $X^5$ are hydrogen, $X^1$ has a meaning other than hydrogen, chlorine, bromine, methyl, acetyl or methylsulfonyl.

The present invention also relates to mixtures of at least two hydroxyquinolone monoazo dyestuffs of the formula I.

The dyestuffs of the formula I according to the invention are preferably prepared by diazotizing a compound of the formula III

in which D is defined as stated above, and coupling the diazotization product to a compound of the formula IV

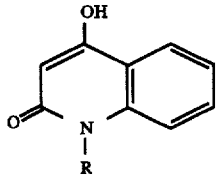

in which R is defined as stated above.

A preferred use of dyestuffs (including dyestuff mixtures) of formula I is in the dyeing and printing of hydrophobic synthetic materials, particularly when the dyeing is carried out at a pH within the range of 8 to 11 and/or when the dyestuff of formula I is applied to the hydrophobic synthetic material in the form of an aqueous dispersion, printing paste, or dye liquor.

DETAILED DESCRIPTION

In the preferred dyestuffs of formula I, above, R is unsubstituted alkyl, particularly preferably ($C_1$–$C_4$)-alkyl, especially preferably ($C_1$–$C_2$)-alkyl, and moreover preferably methyl.

D is preferably a phenyl radical of the formula II.

If the radicals represented by $X^1$ or $X^2$ (of formula II) contain several substituted or unsubstituted alkyl radicals, these can be identical or different.

Alkyl and alkoxy groups can be straight-chain or branched, primarily branched groups (i-alkyl groups) being preferred and straight-chain groups being particularly preferred.

The term ($C_1$–$C_4$)-alkyl includes, for example, methyl, ethyl, n-propyl, i-propyl, n-butyl, i-butyl, sec-butyl and tert-butyl. ($C_1$–$C_6$)-Alkyl furthermore can be, for example, n-pentyl, i-pentyl, sec-pentyl, n-hexyl and i-hexyl. These examples apply accordingly, for example, to ($C_2$–$C_4$)-alkyl, ($C_3$–$C_4$)-alkyl and the like, to the particular substituted alkyl radicals and to the particular alkoxy radicals.

Substituents in the substituted alkyl radicals which the radicals $X^1$ or $X^2$ can contain, for example, chlorine, bromine, ($C_1$–$C_4$)-alkoxy, phenyl and phenoxy. The number of substituents in the substituted alkyl radicals is preferably 1 to 3, particularly preferably 1. In substituted alkyl radicals represented by R, the number of substituents is preferably 1.

In the case of polysubstitution, the substituents can be identical or different.

Examples of ($C_1$–$C_4$)-alkyl substituted by chlorine or bromine are chloromethyl, bromomethyl, 2-chloroethyl, 2-bromoethyl, 3-chloropropyl, 3-bromopropyl, 4-chlorobutyl, 4-bromobutyl and 2,3-dichloropropyl, and examples of ($C_1$–$C_6$)-alkyl substituted by chlorine and bromine include, for example, 6-chlorohexyl and 6-bromohexyl.

The term ($C_1$–$C_4$)-alkyl substituted by ($C_1$–$C_4$)-alkoxy includes, for example, methoxymethyl, ethoxymethyl, n-butoxymethyl, 2-methoxy-, 2-ethoxy-, 2-n-propoxy-, 2-i-propoxy-, 2-n-butoxy-, 2-i-butoxy-, 2-sec-butoxy-and 2-tert-butoxyethyl, 3-methoxy-, 3-ethoxy-, 3-n-propoxy-, 3-i-propoxy-, 3-n-butoxy- and 3-sec-butoxypropyl, 4-methoxy-, 4-ethoxy-, 4-n-propoxy- and 4-n-butoxybutyl, 2,3-dimethoxypropyl and 3-ethoxy-2-methoxypropyl, and ($C_1$–$C_6$)-alkyl substituted by ($C_1$–$C_4$)-alkoxy is furthermore, for example, 6-methoxy- or 6-ethoxyhexyl.

The term ($C_1$–$C_4$)-alkyl substituted by phenoxy or phenyl includes, for example, phenoxymethyl, -ethyl, -propyl and -butyl, benzyl, phenethyl and phenpropyl, primarily branched alkyl being preferred and linear alkyl being particularly preferred. Thus, ($C_1$–$C_6$)-alkyl substituted by phenoxy or phenyl can be, for example, 6-phenoxy- or 6-phenylhexyl.

These examples apply accordingly, for example, to substituted ($C_2$–$C_4$)-alkyl, ($C_3$–$C_4$)-alkyl and the like.

Substituents in the substituted phenyl radicals which can be contained by the $X^1$ or $X^2$ groups include, for example, fluorine, chlorine, bromine, ($C_1$–$C_4$)-alkyl and ($C_1$–$C_4$)-alkoxy. The number of substituents in the substituted phenyl radical is preferably 1 to 3, particularly preferably 1 or 2 and especially preferably 1. In substituted phenyl radicals which can be contained by the R group, the number of substituents is preferably 1. In the case of polysubstitution, the substituents can be identical or different. An individual substituent can be in the ortho-, the meta- or the para-position, and is preferably in the meta- or, in particular, in the para-position. Two substituents can be, for example, in the 2,3-, 2,4-, 2,5-, 2,6-3,4-or 3,5-position.

Examples of substituted phenyl include 2-, 3- and 4-fluorophenyl, 2-, 3- and 4-chlorophenyl, 2-, 3- and 4-bromophenyl, 2-, 3- and 4-methylphenyl, 4-isopropylphenyl, 4-isobutylphenyl, 4-n-butylphenyl, 4-tert-butylphenyl, 2-, 3- and 4-methoxyphenyl, 2-, 3- and 4-ethoxyphenyl, 2-, 3-and 4-n-butoxyphenyl, 2,3-dichlorophenyl, 2,4-dichlorophenyl, 2,5-dichlorophenyl, 3,4-dichlorophenyl, 3,5-dichlorophenyl, 2,3-dimethylphenyl, 2,4-dimethylphenyl, 3,4-dimethylphenyl, 2,5-dimethylphenyl, 2-chloro-4-methylphenyl, 3-chloro-4-methylphenyl, 4-chloro-2-methylphenyl, 2,4-dimethoxyphenyl, 3,4-dimethoxyphenyl, 3-methyl-4-methoxyphenyl and 2,4,5-trimethylphenyl.

Phenoxy substituents are preferably unsubstituted. In the case of substitution by phenyl or phenoxy radicals, the total number of these radicals on the chromophore is preferably 1.

Examples of substituted benzothiazol-2-yl radicals which can be represented by D include 5- and 6-nitrobenzothiazol-2-yl, 6-methoxy- and 6-ethoxybenzothiazol-2-yl, 6-methylbenzothiazol-2-yl, 6-methylsulfonylbenzothiazol-2-yl, 5-, 6- and 7-chlorobenzothiazol-2-yl, 5-, 6-and 7-bromobenzothiazol-2-yl and 5,6- and 6,7-dichlorobenzothiazol-2-yl.

Preferred substituents in the substituted alkyl radicals which $X^1$ or $X^2$ can contain are ($C_3$–$C_4$)-alkoxy and phenyl.

However, alkyl radicals which $X^1$ or $X^2$ contain are preferably unsubstituted. Alkyl groups which the alkylcarbonyl, alkylsulfonyl and the alkyl-substituted aminocarbonyl and aminosulfonyl groups represented by $X^1$ or $X^2$ contain are particularly preferably unsubstituted ($C_2-C_6$)-alkyl radicals, especially preferably ($C_4-C_6$)-alkyl radicals.

The term "alkyl" preferably includes linear groups or primarily branched groups (isoalkyl groups), particularly preferably linear groups. Among the substituted alkyl groups, substituted ($C_2-C_6$)-alkyl groups are preferred.

Among the aminocarbonyl groups represented by $X^1$ or $X^2$, N,N-disubstituted aminocarbonyl groups are preferred. Preferred substituents on aminocarbonyl and aminosulfonyl groups represented by $X^1$ or $X^2$ are alkyl and allyl. Aminocarbonyl or aminosulfonyl groups represented by $X^1$ or $X^2$ are particularly preferably N,N-disubstituted by alkyl radicals.

The sum of carbon atoms in the alkyl and allyl radicals in aminocarbonyl and aminosulfonyl groups which are represented by $X^1$ or $X^2$ and are N,N-disubstituted by alkyl and allyl groups is preferably 4 to 12, particularly preferably 6 to 10.

Preferably, one of the two radicals $X^1$ and $X^2$ in the phenyl radical of the formula II represented by D is hydrogen, chlorine, ($C_2-C_6$)-alkylcarbonyl, substituted ($C_2-C_6$)-alkylcarbonyl, phenylcarbonyl, substituted phenylcarbonyl, phenylsulfonyl, substituted phenylsulfonyl or an N,N-disubstituted aminocarbonyl or aminosulfonyl radical, and the other of the two radicals $X^1$ and $X^2$ is hydrogen or chlorine.

Particularly preferably, $X^1$ is ($C_4-C_6$-alkylcarbonyl, substituted ($C_4-C_6$)-alkylcarbonyl, phenylcarbonyl, substituted phenylcarbonyl, phenylsulfonyl, substituted phenylsulfonyl, N,N-di-(($C_4-C_6$)-alkyl)aminocarbonyl, N,N-di-(($C_4-C_6$)-alkyl)aminocarbonyl which is substituted in one of the alkyl radicals, N,N-di-(($C_4-C_6$)-alkyl)aminocarbonyl which is substituted in both alkyl radicals, N,N-di-(($C_4-C_6$)-alkyl)aminosulfonyl, N,N-di-(($C_4-C_6$)-alkyl)aminosulfonyl which is substituted in one alkyl radical or N,N-di-(($C_4-C_6$)-alkyl)aminosulfonyl which is substituted in both alkyl radicals and $X^2$ is hydrogen, or $X^2$ is ($C_4-C_6$)-alkylcarbonyl, substituted ($C_4-C_6$)-alkylcarbonyl, phenylcarbonyl, substituted phenylcarbonyl, phenylsulfonyl, substituted phenylsulfonyl, N,N-di-(($C_4-C_6$)-alkyl)aminocarbonyl, N,N-di-(($C_4-C_6$)-alkyl)aminocarbonyl which is substituted in one of the alkyl radicals, N,N-di-(($C_4-C_6$)-alkyl)aminocarbonyl which is substituted in both alkyl radicals, N,N-di-(($C_4-C_6$)-alkyl)aminosulfonyl, N,N-di-(($C_4-C_6$)-alkyl)aminosulfonyl which is substituted in one alkyl radical or N,N-di-(($C_4-C_6$)-alkyl)aminosulfonyl which is substituted in both alkyl radicals and $X^1$ is hydrogen, the preferred meanings furthermore preferably applying to alkyl. Especially preferably, $X^1$ is phenylcarbonyl or substituted phenylcarbonyl and $X^2$ is hydrogen, or $X^2$ is phenylcarbonyl or substituted phenylcarbonyl and $X^1$ is hydrogen, substituted phenylcarbonyl furthermore preferably being phenylcarbonyl which is substituted by alkyl.

It is even more preferable if $X^1$ has one of the especially preferred meanings of $X^1$ or $X^2$ and $X^2$ is hydrogen.

Preferably, in the phenyl radical of the formula II represented by D, independently of one another, $X^3$ is hydrogen, nitro or chlorine, $X^4$ is hydrogen or chlorine and $X^5$ is hydrogen.

Preferred compounds of the formula I are those in which one or more radicals have preferred meanings. Particularly preferred compounds of the formula I are those in which D is a phenyl radical of the formula II in which the following combinations of meanings of the radicals $X^1/X^2/X^3/X^4/X^5$ are present:

($C_1-C_6$)-alkylcarbonyl/hydrogen/hydrogen/hydrogen/ hydrogen; substituted ($C_1-C_6$)-alkylcarbonyl/hydrogen/ hydrogen/hydrogen/hydrogen; phenylsulfonyl/hydrogen/ hydrogen/hydrogen/hydrogen; substituted phenylsulfonyl/ hydrogen/hydrogen/hydrogen/hydrogen; hydrogen/($C_1-C_6$) -alkylcarbonyl/hydrogen/hydrogen/ hydrogen; hydrogen/ substituted ($C_1-C_6$)-alkylcarbonyl/hydrogen/hydrogen/ hydrogen; hydrogen/phenylsulfonyl/hydrogen/hydrogen/ hydrogen; hydrogen/substituted phenyisulfonyl/hydrogen/ hydrogen/hydrogen; phenylcarbonyl/hydrogen/nitro/ hydrogen/hydrogen; substituted phenylcarbonyl/hydrogen/ nitro/hydrogen/hydrogen; N,N-disubstituted aminosulfonyl/ hydrogen/nitro/hydrogen/hydrogen; chlorine/chlorine/ hydrogen/hydrogen/hydrogen; N,N-di-(($C_1-C_6$)-alkyl) aminocarbonyl/hydrogen/nitro/ hydrogen/hydrogen; N,N-di-(($C_1-C_6$)-alkyl)aminocarbonyl which is substituted in one of the alkyl radicals/hydrogen/nitro/hydrogen/ hydrogen; N,N-di-(($C_1-C_6$)-alkyl)aminocarbonyl which is substituted in both alkyl radicals/hydrogen/nitro/hydrogen/ hydrogen; N,N-di-(($C_1-C_6$)-alkyl)aminosulfonyl/hydrogen/ nitro/ hydrogen/hydrogen; N,N-di-(($C_1-C_6$)-alkyl) aminosulfonyl which is substituted in one of the alkyl radicals/hydrogen/nitro/hydrogen/hydrogen; N,N-di-( ($C_1-C_6$)-alkyl)aminosulfonyl which is substituted in both alkyl radicals/hydrogen/nitro/hydrogen/hydrogen; and in particular phenylcarbonyl/hydrogen/hydrogen/hydrogen/ hydrogen; substituted phenylcarbonyl/hydrogen/hydrogen/ hydrogen/hydrogen; hydrogen/phenylcarbonyl/hydrogen/ hydrogen/hydrogen; hydrogen/substituted phenylcarbonyl/ hydrogen/hydrogen/hydrogen; N,N-di-(($C_1-C_6$)-alkyl) aminocarbonyl/hydrogen/hydrogen/-hydrogen/hydrogen; N,N-di-(($C_1-C_6$)-alkyl)aminocarbonyl which is substituted in one of the alkyl radicals/hydrogen/hydrogen/hydrogen/ hydrogen; N,N-di-(($C_1-C_6$)-alkyl)aminocarbonyl which is substituted in both alkyl radicals/hydrogen/hydrogen/ hydrogen/hydrogen; N,N-di-(($C_1-C_6$)-alkyl)aminosulfonyl/ hydrogen/hydrogen/hydrogen/hydrogen; N,N-di-(($C_1-C_6$)- alkyl)aminosulfonyl which is substituted in one of the alkyl radicals/hydrogen/hydrogen/hydrogen/hydrogen; N,N-di-( ($C_1-C_6$)-alkyl)aminosulfonyl which is substituted in both alkyl radicals/hydrogen/hydrogen/hydrogen/hydrogen; hydrogen/N,N-di-(($C_1-C_6$)-alkyl)aminocarbonyl/hydrogen/ -hydrogen/hydrogen; hydrogen/N,N-di-(($C_1-C_6$)-alkyl) aminocarbonyl which is substituted in one alkyl radical/ hydrogen/hydrogen/hydrogen; hydrogen/N,N-di-(($C_1-C_6$)- alkyl)aminocarbonyl which is substituted in both alkyl radicals/hydrogen/hydrogen/hydrogen; hydrogen/N,N-di-( ($C_1-C_6$)-alkyl)aminosulfonyl/hydrogen/hydrogen/ hydrogen; hydrogen/N,N-di-(($C_1-C_6$)-alkyl)aminosulfonyl which is substituted in one alkyl radical/hydrogen/hydrogen/ hydrogen; hydrogen/N,N-di-(($C_1-C_6$)-alkyl)aminosulfonyl which is substituted in both alkyl radicals/hydrogen/ hydrogen/hydrogen, preferred compounds furthermore being those in which alkyl radicals have preferred meanings.

As indicated previously, the present invention also relates to mixtures of at least two hydroxyquinolone monoazo dyestuffs of the formula I.

The dyestuff mixtures according to the invention preferably comprise 2 to 4, particularly preferably 2 components. In the dyestuff mixtures according to the invention, the ratio of the various dyestuffs of the formula I can vary within relatively wide limits. In general, the minimum weight content of one component is 10% and its maximum weight content is 90%. In dyestuff mixtures which comprise only two dyestuffs of the formula I, a weight ratio of 70:30 to 30:70 is preferred, i.e. the weight content of one dyestuff is 30 to 70%.

The components preferably differ in the meaning of the radical R and/or in the meaning of alkyl groups which $X^1$ or $X^2$ contain or in the meaning of substituents on phenyl radicals which $X^1$ or $X^2$ contain.

Another embodiment of the present invention relates to mixtures of one or more of the dyestuffs of the formula I with one or more dyestuffs such as are usually used for dyeing hydrophobic synthetic materials and blend fabrics comprising these.

As stated above, the dyestuffs of the formula I according to the invention are preferably prepared by diazotizing a compound of the formula III

D—NH$_2$                (III)

in which D is defined as stated above, and coupling the diazotization product to a compound of the formula IV

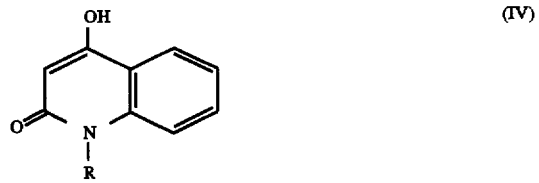

(IV)

in which R is defined as stated above.

A variety of species within the scope of the formulae III and IV are known in the art, and any of the species of these formulae can be prepared by methods known to the person skilled in the art.

The diazotization and coupling can be carried out by methods known in the art, for example analogously to methods such as are described in U.S. Pat. No. 2,529,924 or U.S. Pat. No. 1,969,463.

The dyestuffs of the formula I according to the invention and the mixtures according to the invention are converted into finished forms before dyeing. Typically, they are ground in suitable mills, such as, for example, bead or sand mills, in the presence of water and of dispersing agents and, if a pulverulent finished dyestuff form is to be prepared, are then, for example, spray dried.

Suitable dispersing agents are, for example, anionic or nonionic dispersing agents, which can optionally be employed together.

Suitable anionic dispersing agents include, for example, condensation products of aromatic sulfonic acids and formaldehyde, in particular condensation products of alkylnaphthalenesulfonic acids and formaldehyde, condensation products of optionally substituted phenol with formaldehyde and sodium bisulfite, alkali metal salts of condensation products of optionally substituted phenol, naphthalene- or naphtholsulfonic acids, formaldehyde and sodium bisulfite, alkali metal salts of condensation products of optionally substituted phenolsulfonic acids, formaldehyde and urea, and alkali metal salts of ligninsulfonic acids; alkyl- or alkylaryl-sulfonates, and alkylaryl polyglycol ether-sulfates.

Suitable nonionic dispersing agents or emulsifiers include, for example, reaction products of alkylene oxides, such as ethylene oxide or propylene oxide, with alkylatable compounds, such as, for example, fatty alcohols, fatty amines, fatty acids, phenols, alkylphenols, arylalkylphenols, arylalkylarylphenols and carboxylic acid amides, such as, for example, addition products of 5 to 10 ethylene oxide units on ($C_8$–$C_{10}$)-alkylphenols.

The greatly preferred finishing method, i.e. grinding is carried out at temperatures between 10° and 90° C., preferably at 30° to 60° C. In the case of conversion of separately prepared individual components into a common finished form, common grinding at temperatures above 30° C. is advantageous. During this operation, the dyestuff particles are comminuted mechanically to the extent that an optimum specific surface area is achieved and sedimentation of the dyestuff is as low as possible. The particle sizes of the dyestuffs are in general between 0.5 and 5 μm, preferably about 1 μm.

The dyestuff mixtures according to the invention can be prepared by various processes, for example by mixing the separately prepared individual dyestuffs, individual dyestuffs which have already been converted into a finished form preferably being mixed. This mixing process is carried out in suitable mixers, such as, for example, tumble mixers or stirrers. Individual dyestuffs which have been converted separately into finished forms, however, can also be mixed by being stirred into dye liquors.

Dyestuff mixtures according to the invention can furthermore preferably be prepared by conversion of the separately prepared components of the mixture into a finished form together, that is to say by common grinding and/or, for example, spray drying.

The dyestuffs and dyestuff mixtures according to the invention, individually or as a mixture with other disperse dyestuffs, are outstandingly suitable for dyeing and printing hydrophobic synthetic materials. Suitable hydrophobic synthetic materials can include, for example: secondary cellulose acetate, cellulose triacetate, polyamides and high molecular weight polyester. The dyestuffs according to the invention are preferably employed for dyeing and printing materials of high molecular weight polyesters, in particular those based on polyethylene glycol terephthalates or mixtures thereof with naturally occurring fiber materials, or on materials of cellulose triacetate.

The hydrophobic synthetic materials can be in the form of sheet-like or thread-like structures and can be processed, for example, to yarns or woven, knitted or looped textile materials. Dyeing of the fiber goods mentioned with the dyestuffs or dyestuff mixtures according to the invention can be carried out in a manner known per se, preferably from an aqueous dispersion, if appropriate in the presence of carriers, at between 80° and about 110° C. by the exhaust process, or by the HT process in a dyeing autoclave at 110° to 140° C., and by the so-called thermofixing process, in which the goods are padded with the dye liquor and fixing is then carried out at about 180° to 230° C. Printing of the materials mentioned can be carried out in a manner known per se by incorporating the dyestuffs or dyestuff mixtures according to the invention into a printing paste and treating the goods printed with this paste, for fixing of the dyestuff, with HT steam, pressurized steam or dry heat at temperatures between 180° and 230° C., if appropriate in the presence of a carrier. Very deep dyeings with very good fastness properties during use, such as fastness to thermofixing, washing, water and thermomigration, and in particular a very good fastness to light, are obtained in this manner.

The dyestuffs and dyestuff mixtures according to the invention furthermore are especially suitable for dyeing and printing polyester fibers and polyester microfibers which have been rendered alkaline. Details of the alkaline dyeing or printing process are described, for example, in Chemiefasern/Textilindustrie Volume 41/93, September 1991, page 1118; Textilveredlung 28 (1993), page 88, and Textilveredlung 28 (1993), page 96.

The dyestuffs and dyestuff mixtures according to the invention furthermore are especially suitable for dyeing polyester fibers and polyester fiber materials in an alkaline medium at pH values up to pH 11, in particular at pH 8 to pH 11. Details of this dyeing method are described, for example, in DE-A-3 938 631 or EP-A-499 090.

The dyestuffs or dyestuff mixtures according to the invention are also suitable for dyeing the abovementioned hydrophobic materials from organic solvents by the methods known for this process.

The dyestuffs or dyestuffs mixtures according to the invention are preferably be present in the dye liquors and printing pastes employed in the above applications in as fine a division as possible. The fine division of the dyestuffs is carried out in a manner known per se by a procedure in which the dyestuff obtained during the production is suspended in a liquid medium, preferably in water, together with dispersing agents and the mixture is exposed to the action of shearing forces, the dyestuff particles originally present being comminuted mechanically to the extent such that an optimum specific surface area is achieved and the sedimentation of the dyestuff is as low as possible. The particle sizes of the dyestuffs are in general between 0.5 and 5 µm, preferably about 1 µm.

The dispersing agents co-used during the grinding operation can be nonionic or anionic. Nonionic dispersing agents include, for example, reaction products of alkylene oxides, such as, for example, ethylene oxide or propylene oxide, with alkylatable compounds, such as, for example, fatty alcohols, fatty amines, fatty acids, phenols, alkylphenols and carboxylic acid amides. Anionic dispersing agents include, for example, ligninsulfonates, alkyl- or alkylaryl-sulfonates or alkylaryl polyglycol ether-sulfates.

The dyestuff formulations thus obtained preferably are pourable for most methods of use. To insurable pourability, the dyestuff and dispersing agent content is normally limited in these cases. In general, the dispersions are adjusted to a dyestuff content of up to 50% by weight and a dispersing agent content of up to about 25%. For economic reasons, the dyestuff contents usually do not fall below 15% by weight.

The dispersions can also additionally comprise other auxiliaries, for example those which act as oxidizing agents, such as, for example, sodium m-nitrobenzenesulfonate, or fungicidal agents, such as, for example, sodium o-phenylphenolate, or humectants, such as 1,2-propanediol.

The dyestuff dispersions thus obtained can very advantageously be used for the preparation of printing pastes and dye liquors.

For certain fields of use, powder formulations are preferred. These powders comprise the dyestuff or the dyestuff mixture, dispersing agents and other auxiliaries, such as, for example, wetting agents, oxidizing agents, preservatives and dust removal agents.

A preferred preparation process for pulverulent dyestuff formulations comprises removing the liquid from the liquid dyestuff dispersions described above, for example by vacuum drying, freeze drying, by drying on roller dryers, but preferably by spray drying.

To prepare the dye liquors, the required amounts of the dyestuff formulations which have been prepared in accordance with the foregoing description are diluted with the dyeing medium, preferably with water, to the extent that a liquor ratio of in general 1:5 to 1:50 results for the dyeing operation. Other dyeing auxiliaries, such as dispersing, wetting and fixing auxiliaries, are in general additionally added to the liquors. For example, a pH of 4 to 5 can also be established by addition of organic or inorganic acids, such as acetic acid, succinic acid, boric acid or phosphoric acid.

In the case of dyeing under alkaline conditions, the required pH of the dye liquor can be established before or also during dyeing, for example by addition of bases, such as alkali metal hydroxides, for example aqueous sodium hydroxide solution, alkali metal bicarbonates, for example sodium bicarbonate, or alkali metal carbonates, for example sodium carbonate.

To minimize pH variations, buffer substances such as are described, for example, in JSDC 7-7 (1979), page 47, or JSDC 79 (1981), page 115 are preferably added. Buffer substances which are particularly suitable for dyeing under alkaline conditions are those which have the greatest buffering action in the pH range between 8 and 11. Suitable buffer systems are, for example, acetic acid/sodium pyrophosphate, boric acid/borax, sodium bicarbonate/sodium carbonate, sodium dihydrogen phosphate/disodium hydrogen phosphate, combinations of phosphoric acid, succinic acid and boric acid and salts of these acids, or combinations of organic phosphorus compounds with polycarboxylic acids in the presence of their salts. The amounts of buffer system employed are preferably between 0.5 and 10 g/l.

The amino acids described in DE-A-3 938 631 can also be employed as buffer systems in the manner described therein.

If the dyestuff or the dyestuff mixture is to be used for textile printing, the required amounts of the dyestuff formulations are kneaded in a manner known per se together with thickeners, for example alkali metal alginates or the like, and, if appropriate, further additives, for example fixing accelerators, wetting agents and oxidizing agents, to give printing pastes.

Compared with the commercial yellow dyestuffs, the dyestuffs and dyestuff mixtures according to the invention surprisingly offer significant advantages, in particular in respect of build-up and exhaustion properties. Deeper depths of color can be achieved with them, and they are more economical, since they are absorbed more completely on the goods to be dyed and pollute the wastewater less. Their sensitivity to heat is lower, i.e. the variations in depth of color with variations in dyeing temperature are smaller. They also dye over a shorter dyeing time and are absorbed onto substrates such as, for example, modified polyester, polyamide, cellulose triacetate and secondary cellulose acetate. They also produce level, reproducible dyeings at high wound densities of the substrate and with short liquor ratios.

In particular, they have a very high stability to alkalis and can be used for dyeing from an aqueous dyebath at pH values up to 11 without losses in color strength or variations in color shade occurring. Oligomer-free dyed thread- or sheet-like, in particular thread-like, polyester textile materials can be obtained in this manner in a one-bath process.

Overall, an unforeseeable considerable advantage in terms of use compared with the prior art thus results for the dyestuffs and dyestuff mixtures according to the invention.

The invention is illustrated in more detail by the following examples. Percentage data are percentages by weight.

EXAMPLE 1 a) 23.9 g of 4-amino-4'-isopropyl-benzophenone are beaten in 150 ml of water with 30 ml of concentrated hydrochloric acid overnight, the mixture is diluted with 150 ml of water and diazotization is carried out with a solution of 7.7 g of sodium nitrite in 50 ml of water at 0° to 5° C. in the course of 30 minutes. When the diazotization has ended, the diazo solution is filtered. Meanwhile, 18.4 g of 1-methyl-4-hydroxy-2-quinolone were dissolved in 200 ml of water by addition of 32 g of a 27% strength sodium hydroxide solution. The above diazo solution is added dropwise to this solution at 20° to 25° C. in the course of about 90 minutes and the coupling suspension is stirred overnight to bring the coupling to completion. The dyestuff which has precipitated out is then filtered off, washed with water, blown dry and then recrystallized from 500 ml of methanol. 27.9 g of the dyestuff of the formula Ia

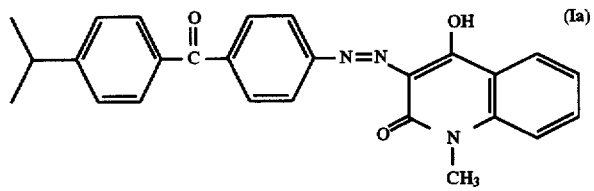

which dissolves in o-dichlorobenzene to give a yellow-colored solution, melts at 193°–195° C. and has its absorption maximum in diethyl phthalate at 430 nm were obtained.

b) 100 g of a woven fabric of polyethylene glycol terephthalate are dyed with a dye liquor comprising 2 l of water, 1.5 g of a 20% strength liquid preparation of the dyestuff of the formula Ia, 2 g of a dyeing auxiliary based on a formaldehyde condensation product and 5 g of a buffer substance, which is a mixture of an organic phosphorus compound and a polycarboxylic acid, in a dyeing autoclave at 130°°C. for 45 minutes, after the pH of the dye liquor has first been adjusted to 10 with aqueous sodium hydroxide solution. The dyeing is then rinsed, purified by reduction, rinsed again and dried. A greenish-tinged yellow dyeing is thus obtained.

The dyeing is repeated, 4 g of sodium acetate now being added as the buffer substance and the pH of the dye liquor being adjusted to 4.5 with acetic acid. The resulting dyeing has practically the same color strength and color shade, and the dyestuff has practically not decomposed at pH 10.

EXAMPLE 2 a) 16.2 g of 3,4-dichloroaniline are diazotized and coupled to 1-methyl-4-hydroxy-2-quinolone in accordance with the instructions in Example Ia. The crude dyestuff isolated, which has been washed with water and blown dry, is recrystallized from 800 ml of methanol. 26.7 g of the dyestuff of the formula Ib

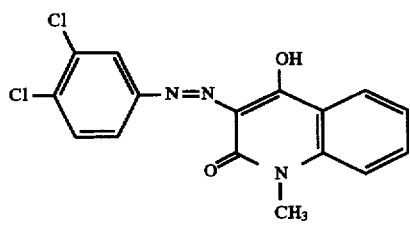

which likewise dissolves in o-di-chlorobenzene to give a yellow-colored solution, melts at 204°–207° C. and has its absorption maximum in diethyl phthalate at 421 nm are obtained.

b) 1.25 g of a 30% strength dyestuff powder of the dyestuff of the formula Ib are dispersed in 2000 g of water. 4 g of sodium acetate and 2 g of a commercially available dispersing agent based on a condensation product of naphthalenesulfonic acid and formaldehyde are added to the dispersion and the pH is adjusted to 4.5 with acetic acid. 100 g of a texturized polyester woven fabric based on polyethylene glycol terephthalate are introduced into the dye liquor thus obtained and dyeing is carried out at 130° C. for ½ hour. After subsequent rinsing, aftertreatment by reduction with a 0.2% strength sodium dithionite solution at 70°–80° C. for 15 minutes, rinsing and drying, a strong yellow dyeing with outstanding coloristic properties is obtained.

EXAMPLE 3 a) 29.3 g of N,N-di-n-butyl-4-amino-3-nitro-benzamide are diazotized in 100 ml of 30% strength acetic acid with 32.7 g of 40% strength nitrosylsulfuric acid at 10°–15° C., and the diazo solution is coupled to 1-methyl-4-hydroxy-2-quinolone in accordance with the instructions in Example Ia. The dyestuff obtained is filtered off with suction, washed with water, blown dry and then recrystallized from 200 ml of methanol. 32 g of the dyestuff of the formula Ic

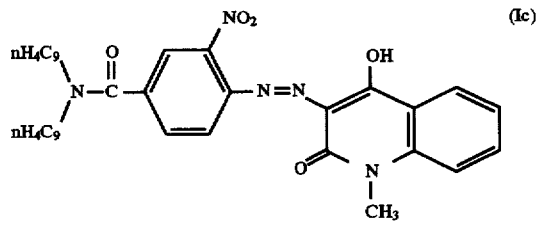

which dissolves in ethyl acetate to give a yellow-colored solution, melts at 116°–119° C. and has its absorption maximum in diethyl phthalate at 433 nm, are obtained.

b) 20 g of a 30% strength liquid preparation of the dyestuff of the formula Ic are stirred into a printing paste which comprises 45 g of carob bean flour, 6 g of sodium 3-nitrobenzenesulfonate and 3 g of citric acid per 1000 g. A polyester woven fabric is printed with a pattern using this printing paste, dried and fixed in a stenter at 195° C. for 40 seconds. After subsequent rinsing, soaping, renewed rinsing and drying, a strong yellow print with outstanding fastness properties is obtained.

Further dyestuffs according to the invention which likewise produce strong yellow dyeings with outstanding fastnesses to light and very good other coloristic properties on polyester are shown in the following tables.

Formula Id applies to the compounds in Table I.

TABLE 1

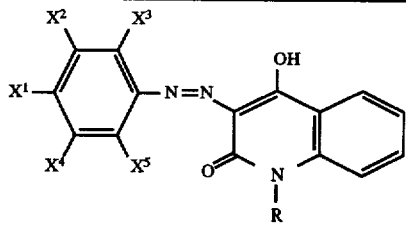

(Id)

| $X^1$ | $X^2$ | $X^3$ | $X^4$ | $X^5$ | R |
|---|---|---|---|---|---|
| $COC_6H_4(4-C_2H_5)$ | H | H | H | H | $CH_3$ |
| $COC_6H_4(4-nC_4H_9)$ | H | H | H | H | $CH_3$ |
| $COC_6H_4(4-CH_3)$ | H | H | H | H | $CH_3$ |
| $COC_6H_3(2,4-di-CH_3)$ | H | H | H | H | $CH_3$ |
| $COC_6H_3(3,4-di-CH_3)$ | H | H | H | H | $CH_3$ |
| $COC_6H_3(2,5-di-CH_3)$ | H | H | H | H | $CH_3$ |
| $COC_6H_2(2,4,5-tri-CH_3)$ | H | H | H | H | $CH_3$ |
| $COC_6H_4(4-Cl)$ | H | H | H | H | $CH_3$ |
| $COC_6H_3(2,4-di-Cl)$ | H | H | H | H | $CH_3$ |
| $COC_6H_3(3,4-di-Cl)$ | H | H | H | H | $CH_3$ |
| $COC_6H_4(4-F)$ | H | H | H | H | $CH_3$ |
| $COC_6H_4(4-Br)$ | H | H | H | H | $CH_3$ |
| $COC_6H_3(3-Cl-4-CH_3)$ | H | H | H | H | $CH_3$ |
| $COC_6H_4(4-OCH_3)$ | H | H | H | H | $CH_3$ |
| $COC_6H_4(4-OC_2H_5)$ | H | H | H | H | $CH_3$ |
| $COC_6H_3(3-CH_3-4-OCH_3)$ | H | H | H | H | $CH_3$ |
| $COC_6H_5$ | H | H | H | H | $CH_3$ |
| $COC_6H_4(4-CH_3)$ | H | Cl | H | H | $CH_3$ |
| $COC_6H_4(4-CH_3)$ | H | $CH_3$ | H | H | $CH_3$ |
| H | $COC_6H_4(4-iC_3H_7)$ | H | H | H | $CH_3$ |
| H | $COC_6H_4(4-secC_4H_9)$ | H | H | H | $CH_3$ |
| H | $COC_6H_4(4-C_2H_5)$ | H | H | H | $CH_3$ |
| H | $COC_6H_4(4-CH_3)$ | H | H | H | $CH_3$ |
| H | $COC_6H_3(2,4-di-CH_3)$ | H | H | H | $CH_3$ |
| H | $COC_6H_3(3,4-di-CH_3)$ | H | H | H | $CH_3$ |
| H | $COC_6H_4(4-Cl)$ | H | H | H | $CH_3$ |
| H | $COC_6H_4(4-OC_2H_5)$ | H | H | H | $CH_3$ |
| H | $COC_6H_5$ | H | H | H | $CH_3$ |
| $CH_3$ | $COC_6H_5$ | H | H | H | $CH_3$ |
| $CH_3$ | $COC_6H_4(4-CH_3)$ | H | H | H | $CH_3$ |
| H | $COC_6H_5$ | H | H | $CH_3$ | $CH_3$ |
| $COnC_5H_{11}$ | H | H | H | H | $CH_3$ |
| $COnC_3H_7$ | H | H | H | H | $CH_3$ |
| $COiC_3H_7$ | H | H | H | H | $CH_3$ |
| $COC_2H_5$ | H | H | H | H | $CH_3$ |
| $COCH_2C_6H_5$ | H | H | H | H | $CH_3$ |
| $CO(CH_2)_2C_6H_5$ | H | H | H | H | $CH_3$ |
| $COCH_2OC_6H_5$ | H | H | H | H | $CH_3$ |
| $CO(CH_2)_2OC_6H_5$ | H | H | H | H | $CH_3$ |
| $COsekC_4H_9$ | $CH_3$ | H | H | H | $CH_3$ |
| $COC_2OnC_4H_9$ | H | H | H | H | $CH_3$ |
| $CO(CH_2)_2OiC_3H_7$ | H | H | H | H | $CH_3$ |
| $CH_3$ | $COiC_5H_{11}$ | H | H | H | $CH_3$ |
| $CH_3$ | $COCH_3$ | H | H | H | $CH_3$ |
| $CH_3$ | $COCH_2C_6H_5$ | H | H | H | $CH_3$ |
| H | $COnC_4H_9$ | H | H | H | $CH_3$ |
| H | $COCH_2C_6H_5$ | H | H | H | $CH_3$ |
| $CON(C_2H_5)_2$ | H | H | H | H | $CH_3$ |
| $CON(CH_3)nC_4H_9$ | H | H | H | H | $CH_3$ |
| $CON(nC_4H_9)_2$ | H | H | H | H | $CH_3$ |
| $CON(nC_6H_{13})_2$ | H | H | H | H | $CH_3$ |
| $CON(C_2H_5)iC_4H_9$ | H | H | H | H | $CH_3$ |
| $CON(CH_2CH=CH_2)_2$ | H | H | H | H | $CH_3$ |
| $CON(CH_3)(CH_2)_3OC_2H_5$ | H | H | H | H | $CH_3$ |
| $CON(C_2H_5)(CH_2)_2OnC_4H_9$ | H | H | H | H | $CH_3$ |
| $CON[(CH_2)_3OiC_3H_7]_2$ | H | H | H | H | $CH_3$ |
| $CON(CH_3)CH_2C_6H_5$ | H | H | H | H | $CH_3$ |
| $CON(C_2H_5)(CH_2)_2C_6H_5$ | H | H | H | H | $CH_3$ |
| $CON(nC_3H_7)C_6H_5$ | H | H | H | H | $CH_3$ |
| $CON[(CH_2)_3OCH_3]C_6H_5$ | H | H | H | H | $CH_3$ |
| $CON(nC_3H_7)_2$ | H | H | H | H | $CH_3$ |
| H | $CON(nC_3H_7)_2$ | H | H | H | $CH_3$ |
| H | $CON(C_2H_5)iC_3H_7$ | H | H | H | $CH_3$ |
| H | $CON(nC_4H_9)CH_2CH=CH_2$ | H | H | H | $CH_3$ |
| H | $CON[(CH_2)_2OiC_3H_7]_2$ | H | H | H | $CH_3$ |

TABLE 1-continued (Id)

| $X^1$ | $X^2$ | $X^3$ | $X^4$ | $X^5$ | R |
|---|---|---|---|---|---|
| H | CON(C_2H_5)(CH_2)_2OC_2H_5 | H | H | H | CH_3 |
| H | CON(CH_3)(CH_2)_2C_6H_5 | H | H | H | CH_3 |
| H | CON(C_2H_5)C_6H_5 | H | H | H | CH_3 |
| H | CON(C_6H_5)(CH_2)OCH_3 | H | H | H | CH_3 |
| Cl | CON(CH_3)sekC_4H_9 | H | H | H | CH_3 |
| Cl | CON(nC_4H_9)C_6H_5 | H | H | H | CH_3 |
| H | CON(C_2H_5)_2 | H | H | H | CH_3 |
| SO_2C_6H_5 | H | H | H | H | CH_3 |
| SO_2C_6H_4(4-iC_3H_7) | H | H | H | H | CH_3 |
| CO_2C_6H_4(4-CH_3) | H | H | H | H | CH_3 |
| SO_2C_6H_4(2-CH_3) | H | H | H | H | CH_3 |
| SO_2C_6H_3(2-CH_3-4-CL) | H | H | H | H | CH_3 |
| SO_2C_6H_3(2-Cl-4-CH_3) | H | H | H | H | CH_3 |
| SO_2C_6H_3(2,4-di-CH_3) | H | H | H | H | CH_3 |
| SO_2C_6H_3(3,4-di-CH_3) | H | H | H | H | CH_3 |
| SO_2C_6H_5 | CH_3 | H | H | H | CH_3 |
| SO_2C_6H_4(4-C_2H_5) | CH_3 | H | H | H | CH_3 |
| SO_2C_6H_5 | H | CH_3 | H | H | CH_3 |
| SO_2C_6H_3(3,4-di-CH_3) | H | Cl | H | H | CH_3 |
| SO_2C_6H_4(4-CH_3) | H | Cl | H | H | CH_3 |
| SO_2C_6H_4(4-F) | H | H | H | H | CH_3 |
| SO_2C_6H_4(4-Cl) | H | H | H | H | CH_3 |
| SO_2C_6H_4(2-CH_3) | H | H | H | H | CH_3 |
| SO_2C_6H_3(2-CH_3-4-Cl) | H | H | H | H | CH_3 |
| SO_2C_6H_4(4-OCH_3) | H | H | H | H | CH_3 |
| H | SO_2C_6H_5 | H | H | H | CH_3 |
| H | SO_2C_6H_4(4-n-C_6H_13) | H | H | H | CH_3 |
| H | SO_2C_6H_3(2,4-di-CH_3) | H | H | H | CH_3 |
| H | SO_2C_6H_4(4-tert-C_4H_9) | H | H | H | CH_3 |
| Cl | SO_2C_6H_3(3,4-di-CH_3) | H | H | H | CH_3 |
| Cl | SO_2C_6H_4(4-Cl) | H | H | H | CH_3 |
| H | SO_2C_6H_4(4-OC_2H_5) | H | H | H | CH_3 |
| H | SO_2C_6H_5 | H | H | CH_3 | CH_3 |
| SO_2C_6H_5 | CH_3 | CH_3 | H | H | CH_3 |
| SO_2C_6H_4(4-n-C_3H_7) | CH_3 | H | H | H | CH_3 |
| SO_2C_2H_5 | H | H | H | H | CH_3 |
| SO_2nC_4H_9 | H | H | H | H | CH_3 |
| SO_2secC_6H_13 | H | H | H | H | CH_3 |
| SO_2cycloC_6H_11 | H | H | H | H | CH_3 |
| SO_2CH_2C_6H_5 | H | H | H | H | CH_3 |
| SO_2(CH_2)_2C_6H_5 | H | H | H | H | CH_3 |
| SO_2(CH_2)_2OCH_3 | H | H | H | H | CH_3 |
| SO_2(CH_2)_2OC_6H_5 | H | H | H | H | CH_3 |
| H | SO_2iC_3H_7 | H | H | H | CH_3 |
| H | SO_2CH_2CH=DH_2 | H | H | H | CH_3 |
| H | SO_2CH_2C_6H_5 | H | H | H | CH_3 |
| H | SO_2(CH_2)_3Otert-C_4H_9 | H | H | H | CH_3 |
| Cl | SO_2nC_5C_11 | H | H | H | CH_3 |
| CH_3 | SO_2CH_2C_6H_5 | H | H | H | CH_3 |
| SO_2nC_3H_7 | CH_3 | H | H | H | CH_3 |
| SO_2cycloC_6H_11 | CH_3 | H | H | H | CH_3 |
| SO_2nC_4H_9 | H | CL | H | H | CH_3 |
| SO_2(CH_2)_2C_6H_5 | H | Cl | H | H | CH_3 |
| SO_2N(C_2H_5)_2 | H | H | H | H | CH_3 |
| SO_2N(CH_3)nC_3H_7 | H | H | H | H | CH_3 |
| SO_2N(nC_3H_7)_2 | H | H | H | H | CH_3 |
| SO_2N(nC_4H_9)_2 | H | H | H | H | CH_3 |
| SO_2N(C_2H_5iC_4H_9 | H | H | H | H | CH_3 |
| SO_2N(C_2H_5)(CH_2)_3OC_2H_5 | H | H | H | H | CH_3 |
| SO_2N[(CH_2)_3OCH_3]_2 | H | H | H | H | CH_3 |
| SO_2N(CH_3)CH_2C_6H_6 | H | H | H | H | CH_3 |
| SO_2N(C_2H_5)C_6H_5 | H | H | H | H | CH_3 |
| SO_2N(CH_2CH=CH_2)_2 | H | H | H | H | CH_3 |
| SO_2N(C_6H_5)(CH_2)_3OnC_4H_9 | H | H | H | H | CH_3 |
| SO_2N[CH_2)_2C_6H_5]_2 | H | H | H | H | CH_3 |

TABLE 1-continued

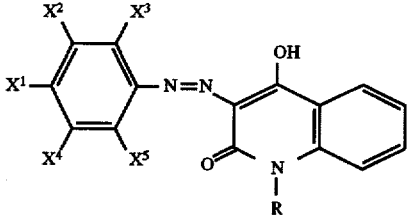

(Id)

| X$^1$ | X$^2$ | X$^3$ | X$^4$ | X$^5$ | R |
|---|---|---|---|---|---|
| SO$_2$N(CH$_3$)iC$_6$H$_{13}$ | CH$_3$ | H | H | H | CH$_3$ |
| SO$_2$N(C$_2$H$_5$)nC$_3$H$_7$ | H | CH$_3$ | H | H | CH$_3$ |
| SO$_2$N(CH$_2$CH=CH$_2$)(CH$_2$)$_2$Cl | H | H | Cl | H | CH$_3$ |
| SO$_2$N(C$_2$H$_5$)(CH$_2$)$_2$OnC$_4$H$_9$ | H | Cl | Cl | H | CH$_3$ |
| SO$_2$N(C$_2$H$_5$)$_2$ | H | CH$_3$ | H | Cl | CH$_3$ |
| H | SO$_2$N(nC$_3$H$_7$)$_2$ | H | H | H | CH$_3$ |
| H | SO$_2$N(nC$_3$H$_7$)nC$_4$H$_9$ | H | H | H | CH$_3$ |
| H | VSO$_2$N(C$_2$H$_5$)(CH$_2$)$_4$OCH$_3$ | H | H | H | CH$_3$ |
| H | SO$_2$N(CH$_3$)C$_6$H$_5$ | H | H | H | CH$_3$ |
| H | SO$_2$N[(CH$_2$)$_3$OCH$_3$]$_2$ | H | H | H | CH$_3$ |
| H | SO$_2$N(C$_2$H$_5$)nC$_6$H$_{13}$ | H | H | H | CH$_3$ |
| CH$_3$ | SO$_2$N(C$_2$H$_5$)$_2$ | H | H | H | CH$_3$ |
| CH$_3$ | SO$_2$N(CH$_3$)C$_6$H$_4$(4-CH$_3$) | H | H | H | CH$_3$ |
| H | SO$_2$N(nC$_3$H$_7$)$_2$ | H | H | CH$_3$ | CH$_3$ |
| H | SO$_2$N(CH$_3$)(CH$_2$)$_3$OCH$_3$ | H | H | CH$_3$ | CH$_3$ |
| Cl | SO$_2$N(nC$_5$H$_{11}$)$_2$ | H | H | H | CH$_3$ |
| H | SO$_2$N(C$_2$H$_5$)iC$_4$H$_9$ | H | H | Cl | CH$_3$ |
| H | SO$_2$N(iC$_4$H$_9$)$_2$ | H | Cl | H | CH$_3$ |
| CH$_3$ | SO$_2$N[(CH$_2$)$_4$OC$_2$H$_5$]$_2$ | H | H | CH$_3$ | CH$_3$ |
| CH$_3$ | SO$_2$N(CH$_3$)$_2$ | H | Cl | H | CH$_3$ |
| H | SO$_2$N(C$_2$H$_5$)CH$_2$CH=CH$_2$ | H | Cl | CH$_3$ | CH$_3$ |
| SO$_2$N(nC$_3$H$_7$)$_2$ | H | NO$_2$ | H | H | CH$_3$ |
| SO$_2$N(C$_2$H$_5$)(CH$_2$)$_2$OC$_2$H$_5$ | H | NO$_2$ | H | H | CH$_3$ |
| SO$_2$N(CH$_3$)iC$_5$H$_{11}$ | H | NO$_2$ | H | H | CH$_3$ |
| SO$_2$N(C$_2$H$_5$)C$_6$H$_4$(4-Cl) | H | NO$_2$ | H | H | CH$_3$ |
| COC$_6$H$_5$ | H | NO$_2$ | H | H | CH$_3$ |
| COC$_6$H$_4$(4-iC$_3$H$_7$) | H | NO$_2$ | H | H | CH$_3$ |
| COC$_6$H$_3$(2,4-di-CH$_3$) | H | NO$_2$ | H | H | CH$_3$ |
| COC$_2$H$_5$ | H | NO$_2$ | H | H | CH$_3$ |
| COsecC$_4$H$_9$ | H | NO$_2$ | H | H | CH$_3$ |
| COCH$_2$C$_6$H$_5$ | H | NO$_2$ | H | H | CH$_3$ |
| CO(CH$_2$)$_2$OC$_6$H$_5$ | H | NO$_2$ | H | H | CH$_3$ |
| CON(C$_2$H$_5$)$_2$ | H | NO$_2$ | H | H | CH$_3$ |
| CON(nC$_4$H$_9$)$_2$ | H | NO$_2$ | H | H | CH$_3$ |
| CON[(CH$_2$)$_3$OnC$_3$H$_7$]$_2$ | H | NO$_2$ | H | H | CH$_3$ |
| CON(C$_2$H$_5$)CH$_2$C$_6$H$_5$ | H | NO$_2$ | H | H | CH$_3$ |
| SO$_2$C$_6$H$_5$ | H | NO$_2$ | H | H | CH$_3$ |
| SO$_2$C$_6$H$_4$(4-iC$_3$H$_7$) | H | NO$_2$ | H | H | CH$_3$ |
| SO$_2$iC$_4$H$_9$ | H | NO$_2$ | H | H | CH$_3$ |
| SO$_2$secC$_8$H$_{13}$ | H | NO$_2$ | H | H | CH$_3$ |
| SO$_2$(CH$_2$)$_2$C$_6$H$_5$ | H | NO$_2$ | H | H | CH$_3$ |
| C$_2$H$_6$ | H | NO$_2$ | H | H | CH$_3$ |
| secC$_4$H$_9$ | H | NO$_2$ | H | H | CH$_3$ |
| OC$_2$H$_5$ | H | NO$_2$ | H | H | CH$_3$ |
| Cl | H | H | H | H | CH$_3$ |
| Cl | Cl | H | H | H | CH$_3$ |
| Cl | H | Cl | H | H | CH$_3$ |
| H | H | CL | Cl | H | CH$_3$ |
| Br | H | H | H | H | CH$_3$ |
| Br | H | Br | H | H | CH$_3$ |
| Br | H | Cl | H | H | CH$_3$ |
| F | Br | H | H | H | CH$_3$ |
| H | H | CH$_3$ | Cl | H | CH$_3$ |
| Cl | H | CH$_3$ | H | H | CH$_3$ |
| H | Cl | CH$_3$ | H | H | CH$_3$ |
| Cl | H | CH$_3$ | Cl | H | CH$_3$ |
| CH$_3$ | Cl | H | H | H | CH$_3$ |
| CH$_3$ | H | H | H | H | CH$_3$ |
| C$_2$H$_5$ | H | H | H | H | CH$_3$ |
| iC$_3$H$_7$ | H | H | H | H | CH$_3$ |
| cycloC$_6$H$_{11}$ | H | H | H | H | CH$_3$ |
| CH$_2$C$_5$H$_5$ | H | H | H | H | CH$_3$ |
| H | CH$_3$ | H | H | H | CH$_3$ |

Formula Ie applies to the compounds of Table II

TABLE II

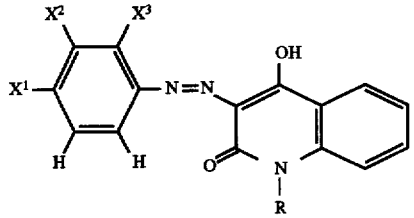

(Ie)

| X¹ | X² | X³ | R |
|---|---|---|---|
| COC₆H₄(4-iC₃H₇) | H | H | C₂H₅ |
| COC₆H₄(3-CH₃) | H | H | C₂H₅ |
| COC₆H₄(3,4-di-CH₃) | H | H | C₂H₅ |
| COC₆H₅ | H | H | nC₄H₉ |
| COC₆H₃(2,4-di-CH₃) | H | H | (CH₂)₃OCH₃ |
| COC₆H₄(4-Cl) | H | H | C₆H₅ |
| H | COC₆H₄(4-iC₃H₇) | H | C₂H₅ |
| H | COC₆H₄(4-C₂H₅) | H | nC₃H₇ |
| H | COC₆H₅ | H | iC₄H₉ |
| COnC₄H₉ | H | H | C₂H₅ |
| COiC₃H₇ | H | H | CH₂C₆H₅ |
| H | COiC₅H₁₁ | H | C₂H₅ |
| CON(nC₃H₇)₂ | H | H | C₂H₅ |
| CON[(CH₂)₂OnC₃H₇)]₂ | H | H | secC₄H₉ |
| H | CON(nC₃H₇)₂ | H | C₂H₅ |
| H | CON(C₂H₅)(CH₂)₃OCH₃ | H | (CH₂)₂C₆H₅ |
| SO₂C₆H₅ | H | H | iC₃H₇ |
| SO₂C₆H₄(4-iC₃H₇) | H | H | (CH₂)₂Cl |
| SO₂C₆H₅ | CH₃ | H | (CH₂)₂OC₆H₅ |
| H | SO₂C₆H₅ | H | iC₅H₁₁ |
| H | SO₂C₆H₃(3,4-di-CH₃) | H | C₂H₅ |
| SO₂iC₄H₉ | H | H | C₂H₅ |
| SO₂CH₂CH=CH₂ | H | H | (CH₂)₂OnC₄H₉ |
| H | SO₂(CH₂)₂C₆H₅ | H | C₂H₅ |
| CH₃ | SO₂C₂H₅ | H | i-C₃H₇ |
| SO₂N(CH₃nC₄H₉) | H | H | C₂H₅ |
| SO₂N(iC₄H₉)₂ | H | H | C₂H₅ |
| SO₂N[(CH₂)₂OnC₄H₉]₂ | H | H | C₂H₅ |
| SO₂N(nC₃H₇)₂ | H | H | (CH₂)₃OCH₃ |
| SO₂N(C₂H₅)₂ | H | H | (CH₂)₂C₆H₅ |
| SO₂N(nC₄H₉)₂ | H | H | nC₆H₁₃ |
| H | SO₂N(C₂H₅)₂ | H | C₂H₅ |
| H | SO₂N[(CH₂)₃OnC₄H₉]₂ | H | nC₄H₉ |
| CH₃ | SO₂N(iC₃H₇nC₄H₉) | H | C₂H₅ |
| CH₃ | SO₂N(CH₂)CH₂CH=CH₂ | H | (CH₂)₂OC₆H₄(4-CH₃) |
| SO₂N(C₂H₅)iC₄H₉ | H | NO₂ | C₂H₅ |
| SO₂N[(CH₂)₂OiC₃H₇)]₂ | H | NO₂ | (CH₂)₂Cl |
| COC₆H₅ | H | NO₃ | (CH₂)₂OC₂H₅ |
| COC₆H₄(4-iC₃H₇) | H | NO₂ | C₂H₅ |
| COiC₃H₇ | H | NO₂ | (CH₂)₄OCH₃ |
| SO₂C₆H₅ | H | NO₂ | CH₂CH(OCH₃)CH₂OCH₃ |
| SO₂iC₃H₇ | H | NO₂ | nC₄H₉ |
| iC₃H₇ | H | NO₂ | (CH₂)₂OC₆H₅ |
| OnC₄H₉ | H | NO₂ | CH₂C₆H₅ |

Formula If applies to the compounds of Table III

TABLE III

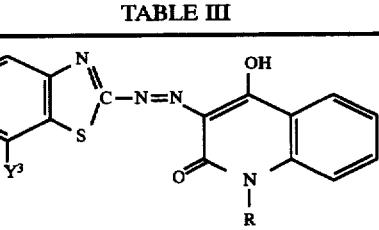

(If)

| Y¹ | Y² | Y³ | R |
|---|---|---|---|
| H | Cl | H | CH₃ |
| Cl | Cl | H | CH₃ |// TABLE III-continued
| H | Cl | Cl | CH₃ |
| H | Br | H | CH₃ |
| NO₂ | H | H | CH₃ |
| H | NO₂ | H | CH₃ |

TABLE III-continued

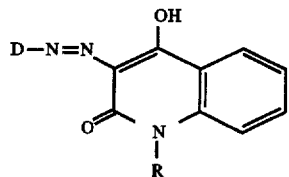

| $Y^1$ | $Y^2$ | $Y^3$ | R |
|---|---|---|---|
| H | $OCH_3$ | H | $CH_3$ |
| H | $OC_2H_5$ | H | $CH_3$ |
| H | $CH_3$ | H | $CH_3$ |
| H | $SO_2CH_3$ | H | $CH_3$ |
| Cl | Cl | H | $C_2H_5$ |
| H | $NO_2$ | H | $nC_4H_9$ |
| H | $OCH_3$ | H | $(CH_2)_3OiC_3H_7$ |

What is claimed is:

1. A hydroxyquinolone monoazo dyestuff of the formula I

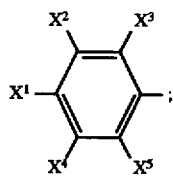

in which

R is $(C_1-C_6)$-alkyl, benzyl or phenyl, or is $(C_2-C_4)$-alkyl, which is mono- or disubstituted by chlorine, bromine, $(C_1-C_4)$-alkoxy, phenyl, phenoxy, phenyl which is mono- or disubstituted by methyl, chlorine or methoxy or phenoxy which is mono- or disubstituted by methyl, chlorine or methoxy;

D is a phenyl radical of the formula II wherein at least one of the two radicals $X^1$ and $X^2$ is:
$((C_1-C_6)$-alkyl)carbonyl, substituted $((C_1-C_6)$-alkyl)-carbonyl, cyclohexylcarbonyl, phenylcarbonyl, substituted phenylcarbonyl, phenylsulfonyl, substituted phenylsulfonyl, N,N-di-$((C_1-C_6)$-alkyl)aminocarbonyl, N,N-di-$((C_1-C_6)$-alkyl)aminocarbonyl which is substituted in one of the alkyl radicals, N,N-di-$((C_1-C_6)$-alkyl)aminocarbonyl which is substituted in both alkyl radicals, N-$((C_1-C_6)$-alkyl) aminocarbonyl, N-$((C_1-C_6)$-alkyl)amino-carbonyl which is substituted in the alkyl radical, N-cyclohexylaminocarbonyl, N-allyl-anminocarbonyl, N-phenylaminocarbonyl, N-phenylaminocarbonyl which is substituted in the phenyl radical, N-phenyl-N-$((C_1-C_6)$-alkyl)aminocarbonyl, N-phenyl-N-($(C_1-C_6)$-alkyl)-aminocarbonyl which is substituted in the alkyl radical, N-phenyl-N-$((C_1-C_6)$-alkyl) aminocarbonyl which is substituted in the phenyl radical, N-phenyl-N-$((C_1-C_6)$-alkyl)amninocarbonyl which is substituted in the alkyl radical and in the phenyl radical, N,N-diallylamninocarbonyl, N-allyl-N-$((C_1-C_6)$-alkyl)aminocarbonyl, N-allyl-N-$((C_1-C_6)$-alkyl)aminocarbonyl which is substituted in the alkyl radical, N-allyl-N-phenylaminocarbonyl, N-allyl-N-phenylaminocarbonyl which is substituted in the phenyl radical, N,N-dicyclohexylaminocarbonyl, N-cyclohexyl-N-$((C_1-C_6)$-alkyl)aminocarbonyl, N-cyclohexyl-N-$((C_1-C_6)$-alkyl)-aminocarbonyl which is substituted in the alkyl radical, N-cyclohexyl-N-phenylaminocarbonyl, N-cyclohexyl-N-phenylaminocarbonyl which is substituted in the phenyl radical or N-cyclohexyl-N-allylaminocarbonyl, or one of the two radicals one of $X^1$ and $X^2$ is as defined above and the other of $X^1$ and $X^2$ is hydrogen, halogen, $(C_1-C_6)$-alkyl, fluorine, phenyl, benzyl, cyclohexyl or $(C_2-C_4)$-alkoxy, or both of the two radicals $X^1$ and $X^2$ are halogen;

$X^3$ is hydrogen, halogen, nitro or $(C_1-C_6)$-alkyl; and $X^4$ and $X^5$ independently of one another are hydrogen, halogen or $(C_1-C_6)$-alkyl.

2. A monoazo dyestuff of the formula I as claimed in claim 1, in which R is $(C_1-C_4)$-alkyl.

3. A monoazo dyestuff of the formula I as claimed in claim 2, wherein R is $C_1$ or $C_2$ alkyl.

4. A monoazo dyestuff of the formula I as claimed in claim 1, in which $X^1$ is $(C_1-C_6)$-alkylcarbonyl, substituted $(C_1-C_6)$-alkylcarbonyl, phenylcarbonyl, substituted phenylcarbonyl, phenylsulfonyl, substituted phenylsulfonyl, N,N-di-$((C_1-C_6)$-alkyl)aminocarbonyl, N,N-di-$((C_1-C_6)$-alkyl)aminocarbonyl which is substituted in one of the alkyl radicals, N,N-di-$((C_1-C_6)$-alkyl)aminocarbonyl which is substituted in both alkyl radicals, and $X^2$, $X^3$, $X^4$ and $X^5$ are hydrogen.

5. A monoazo dyestuff of the formula I as claimed in claim 1, in which $X^2$ is $(C_1-C_6)$-alkylcarbonyl, substituted $(C_1-C_6)$-alkylcarbonyl, phenylcarbonyl, substituted phenylcarbonyl, phenylsulfonyl, substituted phenylsulfonyl, N,N-di-$((C_1-C_6)$-alkyl)aminocarbonyl, N,N-di-$((C_1-C_6)$-alkyl)aminocarbonyl which is substituted in one of the alkyl radicals, N,N-di-$((C_1-C_6)$-alkyl)aminocarbonyl which is substituted in both alkyl radicals, and $X^1$, $X^3$, $X^4$ and $X^5$ are hydrogen.

6. A monoazo dyestuff of the formula I as claimed in claim 1, in which $X^1$ is phenylcarbonyl or substituted phenylcarbonyl and $X^2$, $X^3$, $X^4$ and $X^5$ are hydrogen, or in which $X^2$ is phenylcarbonyl or substituted phenylcarbonyl and $X^1$, $X^3$, $X^4$ and $X^5$ are hydrogen.

7. A monoazo dyestuff of the formula I as claimed in claim 1, in which $X^1$ is phenylcarbonyl, substituted phenylcarbonyl, N,N-di-$((C_1-C_6)$-alkyl)-aminocarbonyl, N,N-di-$((C_1-C_6)$-alkyl)aminocarbonyl which is substituted in one alkyl radical, N,N-di-$((C_1-C_6)$-alkyl)aminocarbonyl which is substituted in both alkyl radicals, $X^3$ is nitro and $X^2$, $X^4$ and $X^5$ are hydrogen.

8. A monoazo dyestuff of the formula I as claimed in claim 1, in which D is 3,4-dichlorophenyl.

9. A monoazodyestuff as claimed in claim 1, wherein at least one of said radicals $X^1$ and $X^2$, has the meaning $C_1-C_6$-alkylcarbonyl, substituted $C_1-C_6$-alkylcarbonyl, halogen; N,N-di-$(C_1-C_6$-alkyl)amino-carbonyl, N,N-di-$(C_1-C_6$-alkyl)amino-carbonyl which is substituted in one or both alkyl groups, phenylcarbonyl, substituted phenylcarbonyl, phenylsulfonyl or substituted phenylsulfonyl.

10. A monoazo dyestuff as claimed in claim 9, wherein one of $X^1$ or $X^2$ is halogen or $C_1-C_6$-alkyl, at least one of said radicals $X^4$, or $X^5$ is halogen or $C_1-C_6$-alkyl and $X^3$ is halogen, nitro or $C_1-C_6$-alkyl.

11. A monoazo dyestuff as claimed in claim 1, wherein one of $X^1$ or $X^2$ is halogen or $C_1$–$C_6$-alkyl, at least one of said radicals $X^4$, or $X^5$ is halogen or $C_1$–$C_6$-alkyl and $X^3$ is halogen, nitro or $C_1$–$C_6$-alkyl.

12. A hydroxyquinolone monoazo dyestuff of the formula I-f

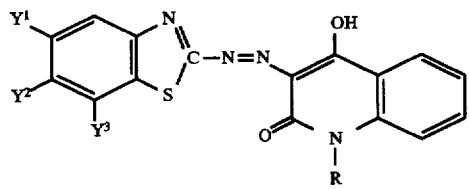

(If)

in which

R is $C_1$–$C_6$-alkyl, benzyl or phenyl, or is ($C_2$–$C_4$)-alkyl, which is mono- or disubstituted by chlorine, bromine, ($C_1$–$C_4$)-alkoxy, phenyl, phenoxy, phenyl which is mono- or disubstituted by methyl, chlorine or methoxy or phenoxy which is mono- or disubstituted by methyl, chlorine or methoxy;

one of the radicals $Y^1$, $Y^2$ and $Y^3$ is chlorine, bromine, nitro, methoxy, ethoxy, methyl or methylsulfonyl, or two of said radicals are chlorine, but all three of said radicals can be hydrogen.

* * * * *